(12) United States Patent
Kumayasu et al.

(10) Patent No.: US 6,934,434 B1
(45) Date of Patent: Aug. 23, 2005

(54) CIRCUIT FOR SWITCHING OPTICAL PATHS

(75) Inventors: Satoshi Kumayasu, Tokyo (JP); Eiichi Nakagawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 94 days.

(21) Appl. No.: 10/168,543

(22) PCT Filed: Nov. 22, 2000

(86) PCT No.: PCT/JP00/08255

§ 371 (c)(1),
(2), (4) Date: Jul. 2, 2002

(87) PCT Pub. No.: WO02/43286

PCT Pub. Date: May 30, 2002

(51) Int. Cl.[7] ................................. G02B 6/26
(52) U.S. Cl. .................. 385/16; 385/24; 398/104; 398/165
(58) Field of Search .............. 385/16, 17, 24, 385/25; 398/1, 2, 104, 165, 140, 141

(56) References Cited

U.S. PATENT DOCUMENTS 5,526,157 A * 6/1996 Kawano .................. 398/1
5,838,477 A * 11/1998 Yamamoto et al. ......... 398/105
6,061,157 A * 5/2000 Terahara .................. 398/1
6,377,373 B1 * 4/2002 Kawazawa et al. ......... 398/82
2002/0057477 A1 * 5/2002 Rocca et al. .............. 359/141

FOREIGN PATENT DOCUMENTS

| JP | 6-61943 | 3/1994 |
| JP | 6-83141 | 10/1994 |
| JP | 2510589 | 4/1996 |
| JP | 08-293854 | 11/1996 |
| JP | 10-164022 | 6/1998 |
| JP | 10-173598 | 6/1998 |
| WO | WO 9611537 A1 * | 4/1996 ........... H04J 14/02 |

* cited by examiner

Primary Examiner—Juliana Kang
(74) Attorney, Agent, or Firm—Oblon, Spivak, McClelland, Maier & Neustadt, P.C.

(57) ABSTRACT

First to sixth optical switches 17 to 22 are provided: in event of failure on the part of a third input/output port 33, only the first and second optical switches 17 and 18 turn ON; in the event of failure on the part of a second input/output port 32, only the third and fourth optical switches 19 and 20 turn ON; and in the event of failure on the part of a first input/output port 31, only the fifth and sixth optical switches 21 and 22 turn ON.

2 Claims, 6 Drawing Sheets

CIRCUIT FOR SWITCHING OPTICAL PATHS

TECHNICAL FIELD

The present invention relates to an optical path switching circuit and, more particularly, to an optical path switching circuit suitable for use in a submarine branching unit that forms an optical submarine cable system.

BACKGROUND ART

In the case where one of three optical cables connected to a submarine branching unit forming an optical submarine cable system suffers a breakdown and can no longer be used, it is desirable to keep the submarine cable system in service through maximum utilization of communication by the other remaining two optical cables. To this end, the optical path connected to the failed optical cable needs to be switched to an optical path connecting other optical cables.

FIG. 1 is a block diagram depicting the construction of an optical path switching circuit that is a prior art example 1 disclosed in Japanese Patent Application Laid-Open Gazette No. 164022/98. In FIG. 1, reference numeral 101 denotes generally an optical switching circuit; 102 denotes a first input port; 103 denotes a first output port; 104 denotes a second input port; 105 denotes a second output port; 106 denotes a third input port; 107 denotes a third output port; 108 to 110 denote first to third preceding optical couplers; 111 to 113 denote first to third succeeding optical couplers; 114 to 116 denote first to third optical filters that permit the passage therethrough of only control signals of predetermined wavelengths; and 117 to 119 denotes first to third optical switches.

Next, the operation of the prior art example will be described below.

An optical signal input via the first input port 102 is branched by the first preceding optical coupler 108 to the first succeeding optical coupler 111 and the first optical filter 114.

When the input optical signal from the first input port 102 contains no control signal, the first optical filter 114 yields no output, and the first optical switch 117 sends an optical signal input via the third input port 106 to the first output port 103.

On the other hand, when the signal from the first input port 102 contains a control signal, the control signal having passed through the first optical filter 114 is input to the first optical switch 117, which sends, in turn, an optical signal input via the second input port 104 to the first output port 103.

Similarly, when the optical signal from the second input port 104 contains no control signal, the second optical switch 118 sends the optical signal input from the input port 102 to the second output port 105. When the optical signal input from the second input port 104 contains a control signal, the second optical switch 118 sends the optical signal input from the third input port 106 to the second output port 105.

Likewise, when the optical signal from the third input port 106 contains no control signal, the third optical switch 119 sends the optical signal input from the second input port 104 to the third output port 107. When the optical signal from the third input port 106 contains a control signal, the third optical switch 119 sends the optical signal input from the first input port 102 to the third output port 107.

FIG. 2 is a block diagram depicting the construction of an optical path switching circuit that is a prior art example 2 set forth in Japanese Patent Publication Gazette No. 83141/94. In FIG. 2, reference numeral 121 denotes generally an optical path switching circuit; 122 to 124 denote first to third input/output ports; 125 and 126 denote first and second input ports of the first input/output port 122; 127 and 128 denote first and second output ports of the first input/output port 122; 129 and 130 denote third and fourth input ports of the second input/output ports 123; 131 and 132 denote third and fourth output ports of the second input/output ports 123; 133 and 134 denote fifth and sixth input ports of the third input/output port 124; 135 and 136 denote fifth and sixth output ports of the third input/output port 124; 137 to 142 denote first and sixth main optical paths; 143 to 148 denote first to sixth optical switches placed in the first to sixth main optical paths; 149 denotes a first switching optical path that interconnects the first and fourth optical switches 143 and 146; 150 denotes a second switching optical path that interconnects the fourth and sixth optical switches 146 and 148; 151 denotes a third switching optical path that interconnects the second and third optical switches 144 and 145; and 152 denotes a fourth switching optical path that interconnects the third and fifth optical switches 145 and 147.

Next, the operation of the above prior art example will be described below.

An optical signal input via the first input port is sent over the second main optical path 138 to the third output port 131. An optical signal input via the second input port 126 is sent over the sixth main optical path 142 to the sixth output port 136. An optical signal input via the third input port 129 is sent over the first main optical path 137 to the first output port 127. An optical signal input via the fourth input port 130 is sent over the third main optical path 139 to the fifth output port 135. An optical signal input via the fifth input port 133 is sent over the fourth main optical path 140 to the fourth output port 132. An optical signal input via the sixth input port 134 is sent over the fifth main optical path 141 to the second output port 128.

In the event of failure on the part of the second input/output port 123, the optical signal input via the fifth input port 133 can be sent over the first switching optical path 149 to the first output port 127 by switching the first and fourth optical switches 143 and 146. Further, the optical signal input via the first input port 125 can be sent over the second switching optical path 151 to the fifth output port 135 by switching the second and third optical switches 144 and 145.

In the event of failure on the part of the third input/output port 124, the optical signal input via the second input port 126 can be sent over the second switching optical path 150 to the fourth output port 132 by switching the fourth and sixth optical switches 146 and 148. Further, the optical signal input via the fourth input port 130 can be sent over the fourth switching optical path 152 to the second output port 128 by switching the third and fifth optical switches 145 and 147.

In the event of failure on the part of the first input/output port 122, the optical signal input via the third input port 129 can be sent over the first and second switching optical paths 149 and 150 to the sixth output port 136 by switching the first and sixth optical switches 143 and 148. Further, the optical signal input via the sixth input port 134 can be sent over the fourth and third switching optical paths 152 and 151 to the third output port 131 by switching the second and fifth optical switches 144 and 147.

Since the optical path branching circuit of the prior art example 1 has such a construction as described above, it is necessary that optical signals be equally distributed to the succeeding optical couplers—this gives rise to the problem of a loss of about 3 dB (50%) inflicted on the optical signal that is output from each output port.

Further, since the optical path branching circuit of the prior art example 2 has such a construction as described above, four optical switches need to be switched in the case where when a failure occurs on the part of any one of three input/output ports, the failed input/output port is disconnected so as to obtain maximum utilization from communications between the remaining input/output ports. Further, each optical switch needs to operate in the event of failure on the part of two input/output ports. This leads to the problem of complexity in the configuration of an optical switch control circuit.

The present invention is intended to solve such problems of the prior art as referred to above, and has for its object to provide an optical path switching circuit that permits reduction of the loss of the output optical signal from each output port and simplification of the optical switch control circuit.

DISCLOSURE OF THE INVENTION

An optical path switching circuit according to an aspect of the present invention comprises: a first input/output port having first and second input ports and first and second output ports; a second input/output port having third and fourth input ports and third and fourth output ports; a third input/output port having fifth and sixth input ports and fifth and sixth output ports; a first optical switch that, during normal operation, forms an optical path from the second input port to the fifth output port and an optical path from the second sixth input port to the fourth output port but, upon occurrence of an abnormal condition on the part of the third input/output port, forms an optical path from the second input port to the fourth output port and an optical path from the sixth input port to the fifth output port; a second optical switch that, during normal operation, forms an optical path from the fourth input port to the sixth output port and an optical path from the fifth input port to the second output port but, upon occurrence of an abnormal condition on the part of the third input/output port, forms an optical path from the fourth input port to the second output port and an optical path from the fifth input port to the sixth output port; a third optical switch that, during normal operation, forms an optical path from the first input port to the third output port and an optical path from the fourth input port to the sixth output port but, upon occurrence of an abnormal condition on the part of the second input/output port, forms an optical path from the first input port to the sixth output port and an optical path from the fourth input port to the third output port; a fourth optical switch that, during normal operation, forms an optical path from the sixth input port to the fourth output port and an optical path from the third input port to the first output port but, upon occurrence of an abnormal condition on the part of the second input/output port, forms an optical path from the sixth input port to the first output port and an optical path from the third input port to the fourth output port; a fifth optical switch that, during normal operation, forms an optical path from the fifth input port to the second output port and an optical path from the first input port to the third output port but, upon occurrence of an abnormal condition on the part of the first input/output port, forms an optical path from the fifth input port to the third output port and an optical path from the first input port to the second output port; and a sixth optical switch that, during normal operation, forms an optical path from the third input port to the first output port and an optical path from the second input port to the fifth output port but, upon occurrence of an abnormal condition on the part of the first input/output port, forms an optical path from the third input port to the fifth output port and an optical path from the second input port to the first output port.

With the above construction, it is possible to obtain an optical path switching circuit that provides decreased loss of the optical signal from each output port, permits simplification of the configuration of the optical switch control circuit and allows an easy failure-recovery check on the part of a failed input/output port.

An optical path switching circuit according to another aspect of the present invention comprises: a first input/output port having first and second input ports and first and second output ports; a second input/output port having third and fourth input ports and third and fourth output ports; a third input/output port having fifth and sixth input ports and fifth and sixth output ports; a first optical switch that, during normal operation, forms an optical path from the second input port to the fifth output port and an optical path from the sixth input port to the fourth output port but, upon occurrence of an abnormal condition on the part of the third input/output port, forms an optical path from the second input port to the fourth output port and an optical path from the sixth input port to the fifth output port; and a second optical switch that, during normal operation, forms an optical path from the fourth input port to the sixth output port and an optical path from the fifth input port to the second output port but, upon occurrence of an abnormal condition on the part of the third input/output port, forms an optical path from the fourth input port to the second output port and an optical path from the fifth input port to the sixth output port; wherein there are always formed an optical path from the first input port to the third output port and an optical path from the third input port to the first output port.

With the above construction, too, it is possible to obtain an optical path switching circuit that provides decreased loss of the optical signal from each output port, permits simplification of the configuration of the optical switch control circuit and allows an easy failure-recovery check on the part of a failed input/output port.

BEST MODE FOR CARRYING OUT THE INVENTION

To facilitate a better understanding of the present invention, the best mode for carrying out the invention will be described below in detail.

Embodiment 1

Figure 1:
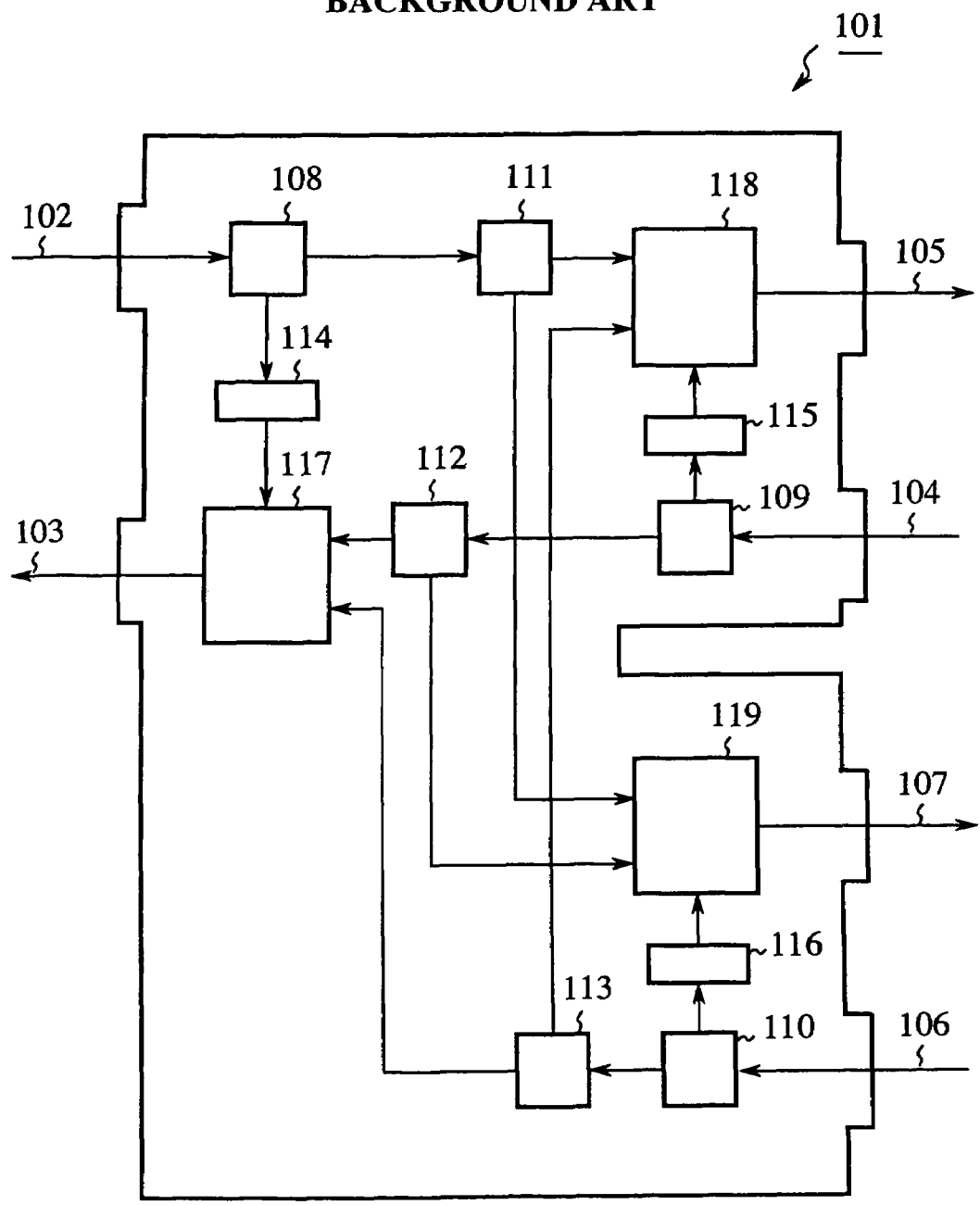
FIG. 1 is a block diagram depicting the construction of an optical path switching circuit of a prior art example 1 shown in Japanese Patent Application Laid-Open Gazette No. 164022/98.
Figure 2:
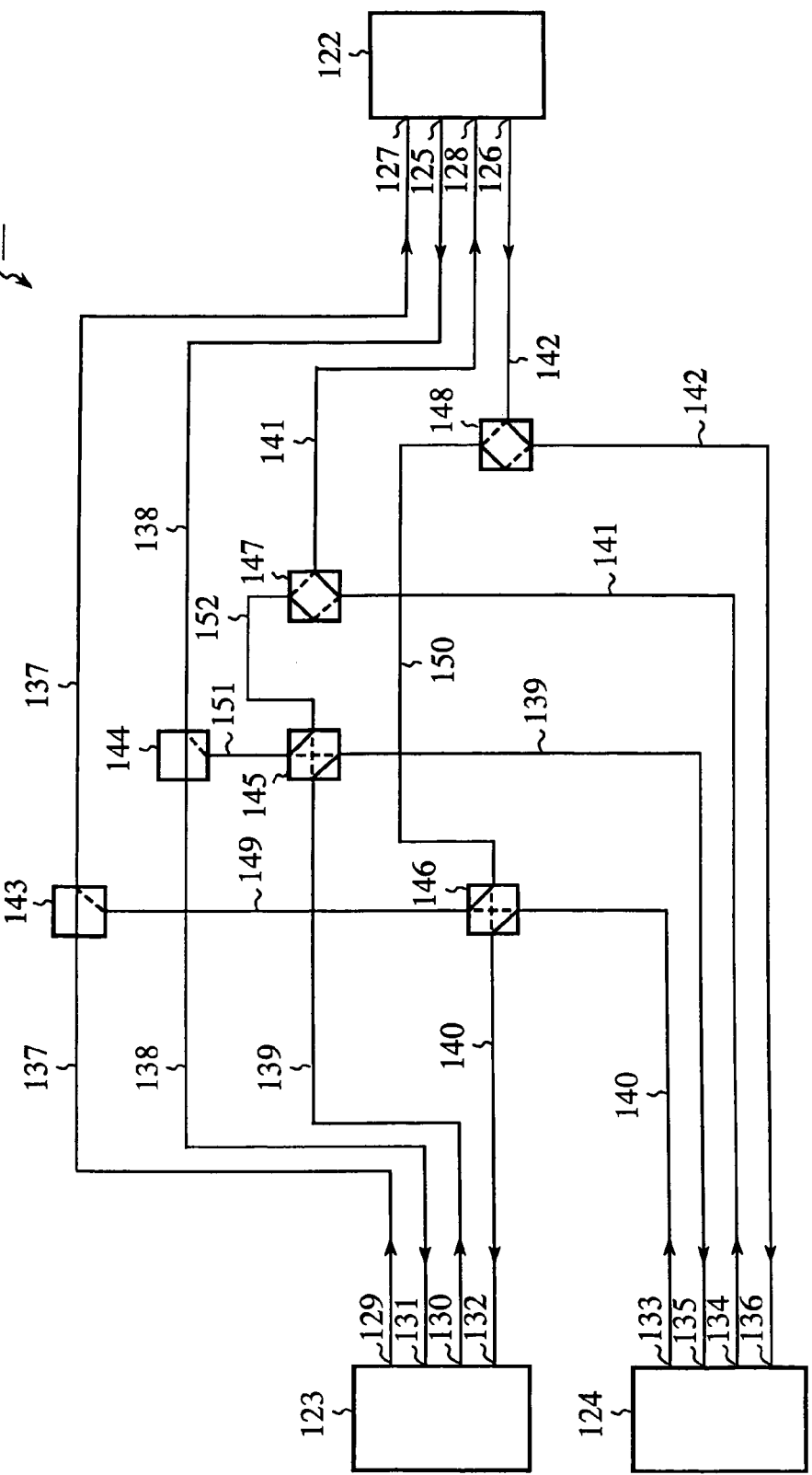
FIG. 2 is a block diagram depicting the construction of an optical path switching circuit of a prior art example 2 set forth in Japanese Patent Publication Gazette No. 83141/94.
Figure 3:
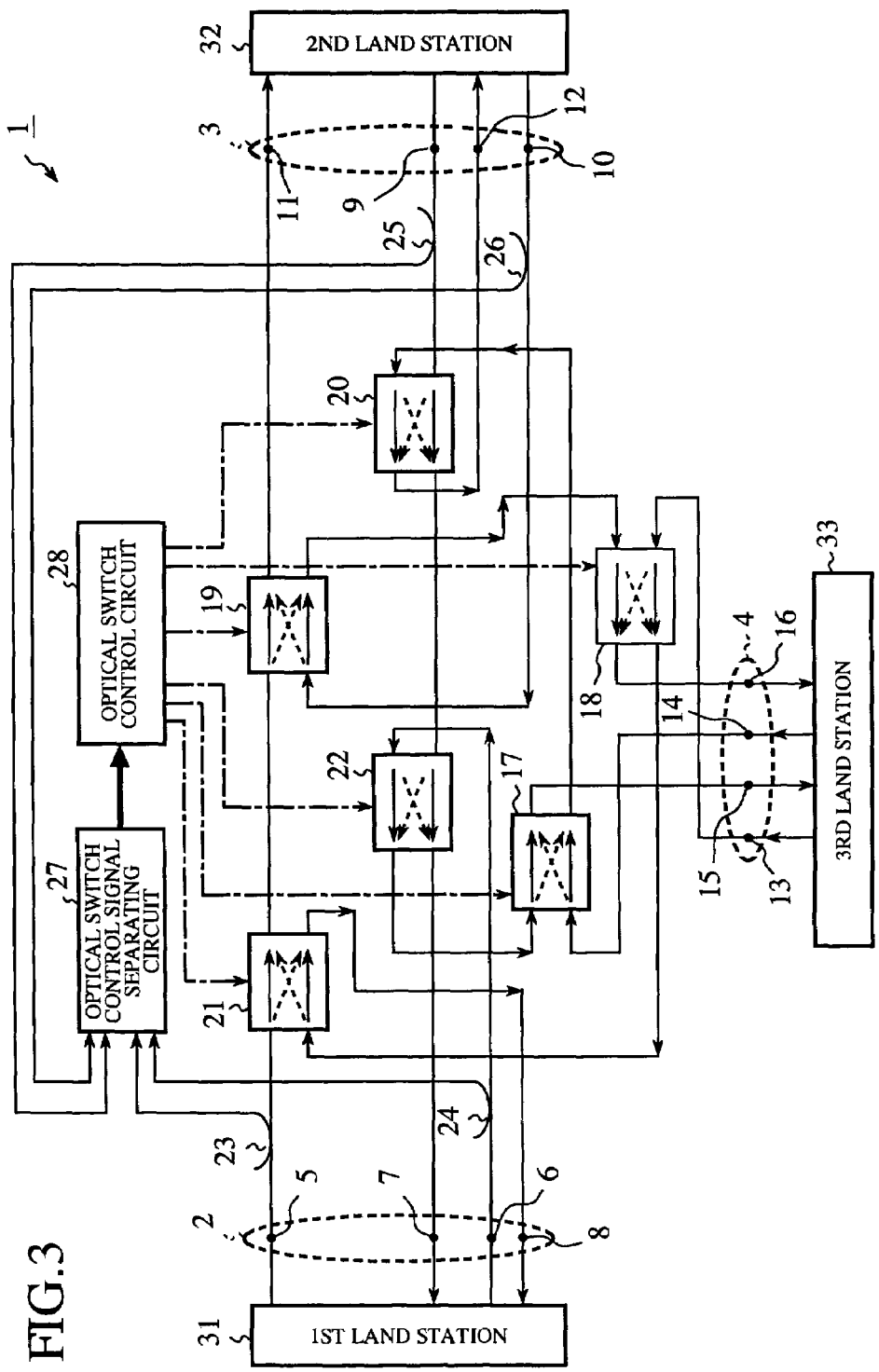
FIG. 3 is a block diagram illustrating the construction of an optical path switching circuit according to Embodiment 1 of the present invention.

FIG. 3 illustrates in block form the construction of the optical path switching circuit according to Embodiment of the present invention. In FIG. 3, reference numeral 1 denotes generally an optical path switching circuit; 2 to 4 denote first to third input/output ports of the optical path switching circuit 1; 5 and 6 denote first and second input ports of the first input/output port 2; 7 and 8 denote first and second output ports of the first input/output port 2; 9 and 10 denote third and fourth input ports of the second input/output port 3; 11 and 12 denote third and fourth output ports of the second input/output port 3; 13 and 14 denote fifth and sixth input ports of the third input/output port 4; 15 and 16 denote fifth and sixth output ports of the third input/output port 4; 17 to 22 denote first to sixth switches; 23 and 34 denote first and second optical couplers for branching optical signals input via the first and second input ports of the first input/output port 2; 25 and 26 denote third and fourth optical couplers for branching optical signals input via the third and fourth input ports 9 and 10 of the second input/output port 3; 27 denotes an optical switch control signal separating circuit for separating optical switch control signals contained in the optical signals branched by the first to fourth optical couplers 23 to 26; and 28 denotes an optical switch control circuit for controlling the first to sixth optical switches 17 to 22 in response to the optical switch control signals separated by the optical switch control signal separating circuit 27. Reference numerals 31 to 33 denote first to third land stations. Incidentally, the first land station 31 and the first input/output port 2, the second land station 32 and the second input/output port 3, and the third land station 33 and the third input/output port 4 are respectively interconnected by optical cables.

In FIG. 3, optical paths in the first to sixth optical switches 17 to 22 during the OFF-state (inoperative) period are indicated by the solid lines, and optical paths in the first to sixth optical switches 17 to 22 during the ON-state (operative) period are indicated by the broken lines.

During normal operation the first to sixth optical switches 17 to 22 are all in the OFF state. In the event of failure on the part of the third input/output port 4 (for example, in the event of failure in the optical cable interconnecting the third land station 33 and the third input/output port 4), only the first and second optical switches 17 and 18 are in the ON state. In the event of failure on the part of the second input/output port 3 (for example, in the event of failure in the optical cable interconnecting the second land station 32 and the second input/output port 3), only the third and fourth optical switches 19 and 20 are in the ON state. In the event of failure on the part of the first input/output port 2 (for example, in the event of failure in the optical cable interconnecting the first land station 31 and the first input/output port 2), only the fifth and sixth optical switches 21 and 22 are in the ON state.

In the OFF state the first optical switch 17 provides an optical path over which to send the input optical signal from the second input port 6 of the first input/output port 2 to the fifth output port 15 of the third input/output port 4 (i.e. an optical path from the second input port 6 to the fifth output port 15) and an optical path over which to send the input optical signal from the sixth input port 14 of the third input/output port 4 to the fourth output port 12 of the second input/output port 3 (i.e. an optical path from the sixth input port 14 to the fourth output port 12). In the ON state the above-mentioned first optical switch provides an optical path over which to send the input optical signal from the second input port 6 of the first input/output port 2 to the fourth output port 12 of the second input/output port 3 (i.e. an optical path from the second input port 6 to the fourth output port 12) and an optical path over which to send the input optical signal from the sixth input port 14 of the third input/output port 4 to the fifth output port 15 of the third input/output port 4 (i.e. an optical path from the sixth input port 14 to the fifth output port 15).

Accordingly, when a failure occurs on the part of the third input/output port 4, the first optical switch changes the optical path from the second input port 6 to the fifth output port 15 (i.e. the optical path from the first input/output port 2 to the third input/output port 4) to the optical path from second input port 6 to the fourth output port 12 (i.e. the optical path from the first input/output port 2 to the second input/output port 3), and changes the optical path from the sixth input port 14 to the fourth input port 12 (i.e. the optical path from the third input/output port 4 to the second input/output port 3) to the optical path from the sixth input port 14 to the fifth output port 15 (i.e. the optical path from the third input/output port 4 to the third input/output port 4).

In the OFF state the second optical switch 18 provides an optical path over which to send the input optical signal from the fourth input port 10 of the second input/output port 3 to the sixth output port 16 of the third input/output port 4 (i.e. an optical path from the fourth input port 10 to the sixth output port 16) and an optical path over which to send the input optical signal from the fifth input port 13 of the third input/output port 4 to the second output port 8 of the first input/output port 2 (i.e. an optical path from the fifth input port 13 to the second output port 8). In the ON state the above-mentioned second optical switch provides an optical path over which to send the input optical signal from the fourth input port 10 of the second input/output port 3 to the second output port 8 of the first input/output port 2 (i.e. an optical path from the fourth input port 10 to the second output port 8) and an optical path over which to send the input optical signal from the fifth input port 13 of the third input/output port 4 to the sixth output port 16 of the third input/output port 4 (i.e. an optical path from the fifth input port 13 to the sixth output port 16).

Accordingly, when a failure occurs on the part of the third input/output port 4, the second optical switch changes the optical path from the fourth input port 10 to the sixth output port 16 (i.e. the optical path from the second input/output port 3 to the third input/output port 4) to the optical path from fourth input port 10 to the second output port 8 (i.e. the optical path from the second input/output port 3 to the first input/output port 2), and changes the optical path from the fifth input port 13 to the second output port 8 (i.e. the optical path from the third input/output port 4 to the first input/output port 2) to the optical path from the fifth input port 13 to the sixth output port 16 (i.e. the optical path from the third input/output port 4 to the third input/output port 4).

In the OFF state the third optical switch 19 provides an optical path over which to send the input optical signal from the first input port 5 of the first input/output port 2 to the third output port 11 of the second input/output port 3 (i.e. an optical path from the first input port 5 to the third output port 11) and an optical path over which to send the input optical signal from the fourth input port 10 of the second input/output port 3 to the sixth output port 16 of the third input/output port 4 (i.e. an optical path from the fourth input port 10 to the sixth output port 16). In the ON state the above-mentioned third optical switch provides an optical path over which to send the input optical signal from the first input port 5 of the first input/output port 2 to the sixth output port 16 of the third input/output port 4 (i.e. an optical path from the first input port 5 to the sixth output port 16) and an optical path over which to send the input optical signal from the fourth input port 10 of the second input/output port 3 to the third output port 11 of the second input/output port 3 (i.e. an optical path from the fourth input port 10 to the third output port 11).

Accordingly, when a failure occurs on the part of the second input/output port 3, the third optical switch 19 changes the optical path from the first input port 5 to the third output port 11 (i.e. the optical path from the first input/output port 2 to the second input/output port 3) to the optical path from first input port 5 to the sixth output port 16 (i.e. the optical path from the first input/output port 2 to the third input/output port 4), and changes the optical path from the fourth input port 10 to the sixth output port 16 (i.e. the optical path from the second input/output port 3 to the third input/output port 4) to the optical path from the fourth input port 19 to the third output port 11 (i.e. the optical path from the second input/output port 3 to the second input/output port 2).

In the OFF state the fourth optical switch 20 provides an optical path over which to send the input optical signal from the sixth input port 14 of the third input/output port 4 to the fourth output port 12 of the second input/output port 3 (i.e. an optical path from the sixth input port 14 to the fourth output port 12) and an optical path over which to send the input optical signal from the third input port 9 of the second input/output port 3 to the first output port 7 of the first input/output port 7 (i.e. an optical path from the third input port 9 to the first output port 7). In the ON state the above-mentioned fourth optical switch provides an optical path over which to send the input optical signal from the sixth input port 14 of the third input/output port 4 to the first output port 7 of the first input/output port 2 (i.e. an optical path from the sixth input port 14 to the first output port 7) and an optical path over which to send the input optical signal from the third input port 9 of the third input/output port 4 to the fourth output port 12 of the second input/output port 3 (i.e. an optical path from the third input port 9 to the fourth output port 12).

Accordingly, when a failure occurs on the part of the second input/output port 3, the fourth optical switch 20 changes the optical path from the sixth input port 14 to the fourth output port 12 (i.e. the optical path from the third input/output port 4 to the second input/output port 3) to the optical path from sixth input port 14 to the first output port 7 (i.e. the optical path from the third input/output port 4 to the first input/output port 2), and changes the optical path from the third input port 9 to the first output port 7 (i.e. the optical path from the second input/output port 3 to the first input/output port 2) to the optical path from the third input port 9 to the fourth output port 12 (i.e. the optical path from the second input/output port 3 to the second input/output port 3).

In the OFF state the fifth optical switch 21 provides an optical path over which to send the input optical signal from the fifth input port 13 of the third input/output port 4 to the second output port 8 of the first input/output port 2 (i.e. an optical path from the fifth input port 14 to the second output port 8) and an optical path over which to send the input optical signal from the first input port 5 of the first input/output port 2 to the third output port 11 of the second input/output port 3 (i.e. an optical path from the first input port 5 to the third output port 11). In the ON state the above-mentioned fifth optical switch provides an optical path over which to send the input optical signal from the fifth input port 13 of the third input/output port 4 to the third output port 11 of the second input/output port 3 (i.e. an optical path from the fifth input port 13 to the third output port 11) and an optical path over which to send the input optical signal from the first input port 5 of the first input/output port 2 to the second output port 8 of the first input/output port 2 (i.e. an optical path from the first input port 5 to the second output port 8).

Accordingly, when a failure occurs on the part of the first input/output port 2, the fifth optical switch changes the optical path from the fifth input port 13 to the second output port 8 (i.e. the optical path from the third input/output port 4 to the first input/output port 2) to the optical path from fifth input port 13 to the third output port 11 (i.e. the optical path from the third input/output port 4 to the second input/output port 3), and changes the optical path from the first input port 5 to the third output port 11 (i.e. the optical path from the third input/output port 4 to the second input/output port 3) to the optical path from the first input port 5 to the second output port 8 (i.e. the optical path from the first input/output port 2 to the first input/output port 2).

In the OFF state the sixth optical switch 22 provides an optical path over which to send the input optical signal from the third input port 9 of the second input/output port 3 to the first output port 7 of the first input/output port 2 (i.e. an optical path from the third input port 9 to the first output port 7) and an optical path over which to send the input optical signal from the second input port 6 of the first input/output port 2 to the fifth output port 15 of the third input/output port 4 (i.e. an optical path from the second input port 6 to the fifth output port 15). In the ON state the above-mentioned sixth optical switch provides an optical path over which to send the input optical signal from the third input port 9 of the second input/output port 3 to the fifth output port 15 of the third input/output port 4 (i.e. an optical path from the third input port 9 to the fifth output port 15) and an optical path over which to send the input optical signal from the second input port 6 of the first input/output port 2 to the first output port 7 of the first input/output port 2 (i.e. an optical path from the second input port 6 to the first output port 7).

Accordingly, when a failure occurs on the part of the first input/output port 2, the sixth optical switch changes the optical path from the third input port 9 to the first output port 7 (i.e. the optical path from the second input/output port 3 to the first input/output port 2) to the optical path from third input port 9 to the fifth output port 15 (i.e. the optical path from the second input/output port 3 to the third input/output port 4), and changes the optical path from the second input port 6 to the fifth output port 15 (i.e. the optical path from the first input/output port 2 to the third input/output port 4) to the optical path from the second input port 6 to the first output port 7 (i.e. the optical path from the first input/output port 2 to the first input/output port 2).

Next, the operation of this embodiment will be described below.

Figure 4:
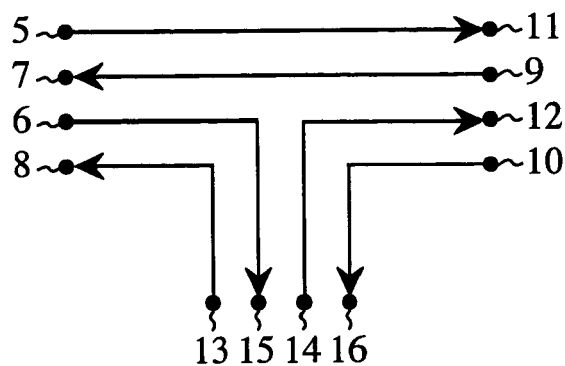
FIG. 4 is a conceptual diagram showing optical paths in the optical path switching circuit according to Embodiment 1 during normal operation.

During normal operation the first to sixth optical switches 17 to 22 are all in the OFF state, and the optical paths in the optical path switching circuit 1 are such as shown in FIG. 4. Accordingly, an optical signal input from the first land station 31 to the first input port 5 is sent to the third output port 11, from which it is sent to the second land station 32. An optical signal input from the first land station 31 to the second input port 6 is sent to the fifth output port 15, from which it is sent to the third land station 33. An optical signal input from the second land station 32 to the third input port 9 is sent to the first output port 7, from which it is sent to the first land station 31. An optical signal input from the second land station 32 to the fourth input port 10 is sent to the sixth output port 16, from which it is sent to the third land station 33. An optical signal input from the third land station 33 to the fifth input port 13 is sent to the second output port 8, from which it is sent to the first land station 31. An optical signal input from the third land station 33 to the sixth input port 14 is sent to the fourth output port 12, from which it is sent to the second land station 32.

Figure 5:
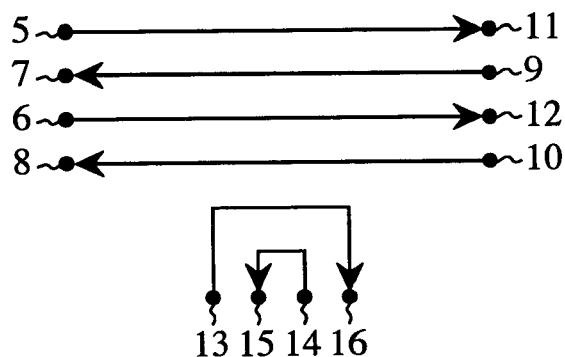
FIG. 5 is a conceptual diagram showing optical paths in the optical path switching circuit according to Embodiment 1 in the event of failure on the part of a first third input/output port.

When a failure occurs on the part of the third input/output port 4 and the optical signal input from the third land station 33 to the fifth input port 13 cannot be normally sent to the first land station 31, the first land station 31 inputs to either one or both of the first and second input ports 5 and 6 optical signals containing optical switch control signals that turn ON the first and second optical switches 17 and 18. The optical signal fed to the first input port 5 is branched by the first optical coupler 23 for input to the optical switch control signal separating circuit 27. The optical signal fed to the second input port 6 is branched by the second optical coupler 24 for input to the optical switch control signal separating circuit 27. The optical switch control signal separating circuit 27 separates the optical switch control signals contained in the optical signals branched by the first and second photocouplers 23 and 24, and provides them to the optical switch control circuit 28. The optical switch control circuit 28 responds to the optical switch control signals to output drive signals to the first and second optical switches 17 and 18. The first and second optical switches 17 and 16 are turned ON and the optical paths in the optical path switching circuit 1 become such as shown in FIG. 5.

That is, the optical path from the second input port 6 to the fifth output port 15 (i.e. the optical path from the first input/output port 2 to the third input/output port 4) changes to the optical path from the second input port 6 to the fourth output port 12 (i.e. the optical path from the first input/output port 2 to the second input/output port 3), and the optical path from the fourth input port 10 to the sixth output port 16 (i.e. the optical path from the second input/output port 3 to the third input/output port 4) changes to the optical path from the fourth input port 10 to the second output port 8 (i.e. the optical path from the second input/output port 3 to the first input/output port 2). Hence, it is possible to make full use of communications between the first and second land stations 31 and 32.

Further, the optical path from the sixth input port 14 to the fourth output port 12 (i.e. the optical path from the third input/output port 4 to the second input/output port 3) switches to the optical path from the sixth input 14 to the fifth output port 15 (i.e. the optical path from the third input/output port 4 to the third input/output port 4), and the optical path from the fifth input port 13 to the second output port 8 (i.e. the optical path from the third input/output port 4 to the first input/output port 2) switches to the optical path from the fifth input port 13 to the sixth output port 16 (i.e. the optical path from the third input/output port 4 to the third input/output port 4), thereby forming a loopback circuit. This enables the third land station 33 to check the failure-recovery status in the third input/output port 4 by observing the state of the optical signal fed to the fifth input port 13 and put out from the sixth output port 16 and the state of the optical signal fed to the sixth input port 14 and put out from the fifth output port 15.

Thereafter, upon sending from the first land station 31 to either one or both of the first and second input ports 5 and 6 optical signals containing optical switch control signals for turning OFF the first and second optical switches 17 and 18, for example, when the failure on the part of the third input/output port 4 has been corrected, the first and second optical switches 17 and 18 turn OFF, allowing the optical path switching circuit 1 to reestablish the optical paths shown in FIG. 4.

Figure 6:
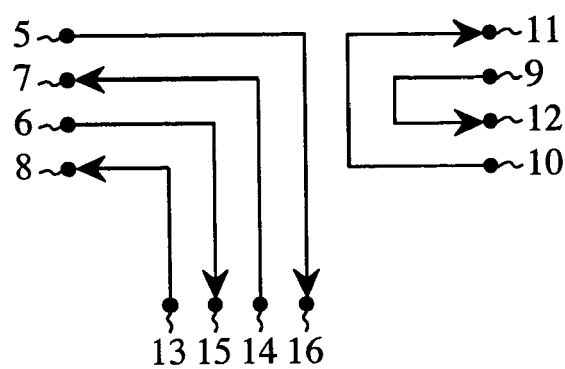
FIG. 6 is a conceptual diagram showing optical paths in the optical path switching circuit according to Embodiment 1 in the event of failure on the part of a second input/output port.

When a failure occurs on the part of the second input/output port 3 and the optical signal input from the second land station 32 to the third input port 9 cannot be normally sent to the first land station 31, the first land station 31 inputs to either one or both of the first and second input ports 5 and 6 optical signals containing optical switch control signals that turn ON the third and fourth optical switches 19 and 20. The third and fourth optical switches 19 and 20 are turned ON by drive signals from the optical switch control circuit 28, and the optical paths in the optical path switching circuit 1 become such as shown in FIG. 6.

That is, the optical path from the first input port 5 to the third output port 11 (i.e. the optical path from the first input/output port 2 to the second input/output port 3) changes to the optical path from the first input port 5 to the sixth output port 16 (i.e. the optical path from the first input/output port 2 to the third input/output port 4), and the optical path from the sixth input port 14 to the fourth output port 12 (i.e. the optical path from the third input/output port 4 to the second input/output port 3) changes to the optical path from the sixth input port 14 to the first output port 7 (i.e. the optical path from the third input/output port 4 to the first input/output port 2). Hence, it is possible to make full use of communications between the first and third land stations 31 and 33.

Further, the optical path from the fourth input port 10 to the sixth output port 16 (i.e. the optical path from the second input/output port 3 to the third input/output port 4) switches to the optical path from the fourth input 10 to the third output port 11 (i.e. the optical path from the second input/output port 2 to the second input/output port 3), and the optical path from the third input port 9 to the fourth output port 12 (i.e. the optical path from the second input/output port 3 to the first input/output port 2) switches to the optical path from the third input port 9 to the fourth output port 12 (i.e. the optical path from the second input/output port 3 to the second input/output port 3), thereby forming a loopback circuit. This enables the second land station 32 to check the failure-recovery status in the second input/output port 3.

Thereafter, upon sending from the first land station 31 to either one or both of the first and second input ports 5 and 6 optical signals containing optical switch control signals for turning OFF the third and fourth optical switches 19 and 20, for example, when the failure on the part of the second input/output port 3 has been corrected, the third and fourth optical switches 19 and 20 turn OFF, allowing the optical path switching circuit 1 to reestablish the optical paths shown in FIG. 4.

Figure 7:
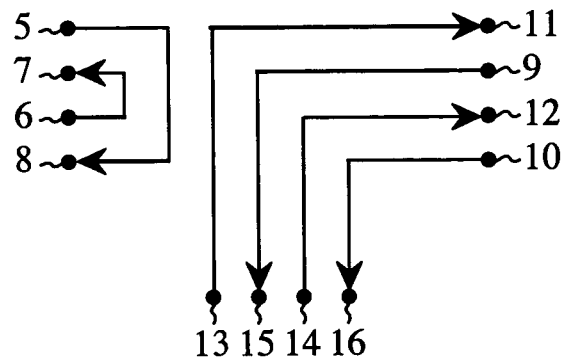
FIG. 7 is a conceptual diagram showing optical paths in the optical path switching circuit according to Embodiment 1 in the event of failure on the part of a first input/output port.

When a failure occurs on the part of the first input/output port 2 and the optical signal input from the first land station 31 to the first input port 5 cannot be normally sent to the second land station 32, the second land station 32 inputs to either one or both of the third and fourth input ports 9 and 10 optical signals containing optical switch control signals that turn ON the fifth and sixth optical switches 21 and 22. The optical signal input to the third input port 9 is branched by the third optical coupler 25 to the optical switch control signal separating circuit 27. The optical signal input to the fourth input port 10 is branched by the fourth optical coupler 26 to the optical switch control signal separating circuit 27. The optical switch control signal separating circuit 27 separates the optical switch control signals contained in the optical signals branched by the third and fourth optical couplers 25 and 26, and provides them to the optical switch control circuit 28. The optical switch control circuit 28 responds to the optical switch control signals to output drive signals to the fifth and sixth optical switches 21 and 22. The fifth and sixth optical switches 21 and 22 are turned ON by drive signals, and the optical paths in the optical path switching circuit 1 become such as shown in FIG. 7.

That is, the optical path from the fifth input port 13 to the second output port 8 (i.e. the optical path from the third input/output port 4 to the first input/output port 2) changes to the optical path from the fifth input port 13 to the third output port 11 (i.e. the optical path from the third input/output port 4 to the second input/output port 3), and the optical path from the third input port 9 to the first output port 7 (i.e. the optical path from the second input/output port 3 to the first input/output port 2) changes to the optical path from the third input port 9 to the fifth output port 15 (i.e. the optical path from the second input/output port 3 to the third input/output port 4). Hence, it is possible to make full use of communications between the second and third land stations 32 and 33.

Further, the optical path from the first input port 5 to the third output port 11 (i.e. the optical path from the first input/output port 2 to the second input/output port 3) switches to the optical path from the first input 5 to the second output port 8 (i.e. the optical path from the first input/output port 2 to the first input/output port 2), and the optical path from the second input port 6 to the fifth output port 15 (i.e. the optical path from the first input/output port 2 to the third input/output port 4) switches to the optical path from the second input port 6 to the first output port 7 (i.e. the optical path from the first input/output port 2 to the first input/output port 2), thereby forming a loopback circuit. This enables the first land station 31 to check the failure-recovery status in the first input/output port 2.

Thereafter, upon sending from the second land station 32 to either one or both of the third and fourth input ports 9 and 10 optical signals containing optical switch control signals for turning OFF the fifth and sixth optical switches 21 and 22, for example, when the failure on the part of the first input/output port 2 has been corrected, the fifth and sixth optical switches 21 and 22 turn OFF, allowing the optical path switching circuit 1 to reestablish the optical paths shown in FIG. 4.

When a failure occurs on the part of the third input/output port 3 and the optical signal input from the third land station 33 to the sixth input port 14 cannot be normally sent to the second land station 32, the second land station 32 inputs to either one or both of the third and fourth input ports 9 and 10 optical signals containing optical switch control signals that turn ON the first and second optical switches 17 and 18. The first and second optical switches 17 and 18 are turned ON by drive signals from the optical switch control circuit 28, and the optical paths in the optical path switching circuit 1 become such as shown in FIG. 5.

Thereafter, upon sending from the second land station 32 to either one or both of the third and fourth input ports 9 and 10 optical signals containing optical switch control signals for turning OFF the first and second optical switches 17 and 18, for example, when the failure on the part of the third input/output port 4 has been corrected, the first and second optical switches 17 and 18 turn OFF, allowing the optical path switching circuit 1 to reestablish the optical paths shown in FIG. 4.

As described above, according to Embodiment 1, since only optical switches are used as optical path switching elements, the use of optical switches of low insertion loss permits reduction of the loss of the optical signal from each output.

Further, according to Embodiment 1, in the event of failure on the part of one input/output port, only two optical switches operate and each optical switch needs only to operate in the event of failure on the part of one input/output port—this permits simplification of the construction of the optical switch control circuit.

Moreover, according to Embodiment 1, since a loopback circuit is formed on the part of the failing input/output port, the failure-recovery status can be checked with ease.

Embodiment 2

While Embodiment 1 has been described to be capable of switching optical paths so that even in the event of failure on the part of any one of three input/output ports communications between the other remaining two input/output ports can be fully utilized, this embodiment will be described to be capable of switching optical paths so that only in the event of failure on the part of a specified one of three input/output ports communications between the other remaining two input/output ports can be fully utilized.

Figure 8:
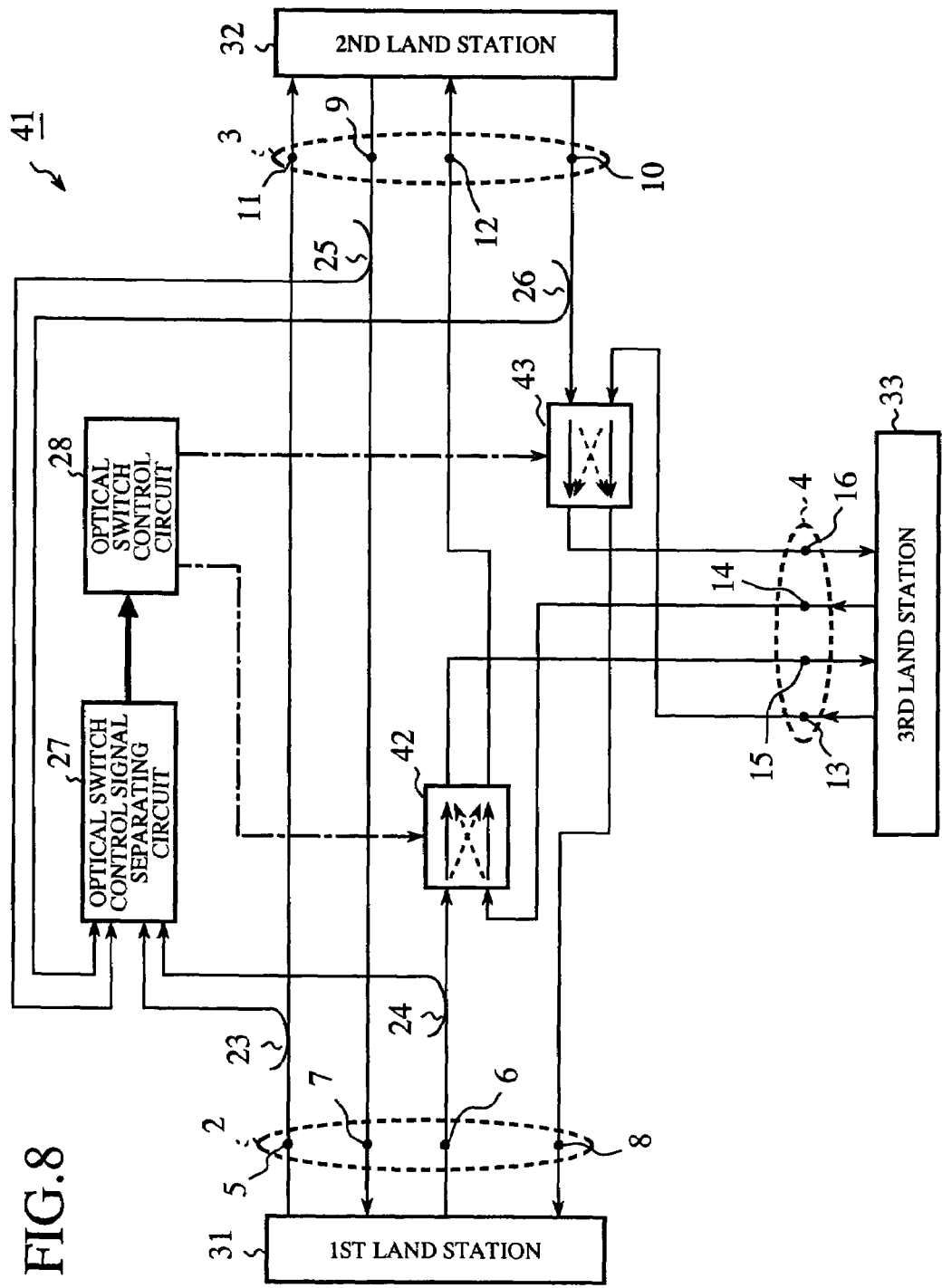
FIG. 8 is a block diagram illustrating the construction of an optical path switching circuit according to Embodiment 2 of the present invention.

FIG. 8 illustrates in block form the construction of an optical path switching circuit according to Embodiment 2 of the present invention. In FIG. 8, reference numeral 41 denotes generally an optical path switching circuit, and 42 and 43 denote first and second optical switch circuits. Since the other constituents are the same as or identical with those identified by the same reference numerals in FIG. 3, no description will be repeated on them.

In FIG. 8, optical paths in the first and second optical switches 42 and 43 during the OFF-state (inoperative) period are indicated by the solid lines, and optical paths in the first and second optical switches 42 and 43 during the ON-state (operative) period are indicated by the broken lines.

During normal operation the first and second optical switches 42 and 43 are in the OFF state. In the event of failure on the part of the third input/output port 4 (for example, in the event of failure in the optical cable interconnecting the third land station 33 and the third input/output port 4), the first and second optical switches 42 and 43 are in the ON state.

In the OFF state the first optical switch 42 provides an optical path over which to send the input optical signal from the second input port 6 of the first input/output port 2 to the fifth output port 15 of the third input/output port 4 (i.e. an optical path from the second input port 6 to the fifth output port 15) and an optical path over which to send the input optical signal from the sixth input port 14 of the third input/output port 4 to the fourth output port 12 of the second input/output port 3 (i.e. an optical path from the sixth input port 14 to the fourth output port 12). In the ON state the above-mentioned first optical switch provides an optical path over which to send the input optical signal from the second input port 6 of the first input/output port 2 to the fourth output port 12 of the second input/output port 3 (i.e. an optical path from the second input port 6 to the fourth output port 12) and an optical path over which to send the input optical signal from the sixth input port 14 of the third input/output port 4 to the fifth output port 15 of the third input/output port 4 (i.e. an optical path from the sixth input port 14 to the fifth output port 15).

Accordingly, when a failure occurs on the part of the third input/output port 4, the first optical switch 42 changes the optical path from the second input port 6 to the fifth output port 15 (i.e. the optical path from the first input/output port 2 to the third input/output port 4) to the optical path from second input port 6 to the fourth output port 12 (i.e. the optical path from the first input/output port 2 to the second input/output port 3), and changes the optical path from the sixth input port 14 to the fourth input port 12 (i.e. the optical path from the third input/output port 4 to the second input/output port 3) to the optical path from the sixth input port 14 to the fifth output port 15 (i.e. the optical path from the third input/output port 4 to the third input/output port 4).

In the OFF state the second optical switch 43 provides an optical path over which to send the input optical signal from the fourth input port 10 of the second input/output port 3 to the sixth output port 16 of the third input/output port 4 (i.e. an optical path from the fourth input port 10 to the sixth output port 16) and an optical path over which to send the input optical signal from the fifth input port 13 of the third input/output port 4 to the second output port 8 of the first input/output port 2 (i.e. an optical path from the fifth input port 13 to the second output port 8). In the ON state the above-mentioned second optical switch provides an optical path over which to send the input optical signal from the fourth input port 10 of the second input/output port 3 to the second output port 8 of the first input/output port 2 (i.e. an optical path from the fourth input port 10 to the second output port 8) and an optical path over which to send the input optical signal from the fifth input port 13 of the third input/output port 4 to the sixth output port 16 of the third input/output port 4 (i.e. an optical path from the fifth input port 13 to the sixth output port 16).

Accordingly, when a failure occurs on the part of the third input/output port 4, the second optical switch 43 changes the optical path from the fourth input port 10 to the sixth output port 16 (i.e. the optical path from the second input/output port 3 to the third input/output port 4) to the optical path from fourth input port 10 to the second output port 8 (i.e. the optical path from the second input/output port 3 to the first input/output port 2), and changes the optical path from the fifth input port 13 to the second output port 8 (i.e. the optical path from the third input/output port 4 to the first input/output port 2) to the optical path from the fifth input port 13 to the sixth output port 16 (i.e. the optical path from the third input/output port 4 to the third input/output port 4).

Further, there are always established an optical path over which to send an optical signal input via the first input port 5 of the first input/output port 1 to the third output port 11 of the second input/output port 3 (i.e. an optical path from the first input port 5 to the third output port 11) and an optical path over which to send an optical signal input via the third input port 9 of the second input/output port 3 to the first output port 7 of the first input/output port 2 (i.e. an optical path from the third input port 9 to the first output port 7).

Next, the operation of this embodiment will be described below.

During normal operation the first to sixth optical switches 42 and 43 are both in the OFF state, and the optical paths in the optical path switching circuit 1 are such as shown in FIG. 4. Accordingly, an optical signal input from the first land station 31 to the first input port 5 is sent to the third output port 11, from which it is sent to the second land station 32. An optical signal input from the first land station 31 to the second input port 6 is sent to the fifth output port 15, from which it is sent to the third land station 33. An optical signal input from the second land station 32 to the third input port 9 is sent to the first output port 7, from which it is sent to the first land station 31. An optical signal input from the second land station 32 to the fourth input port 10 is sent to the sixth output port 16, from which it is sent to the third land station 33. An optical signal input from the third land station 33 to the fifth input port 13 is sent to the second output port 8, from which it is sent to the first land station 31. An optical signal input from the third land station 33 to the sixth input port 14 is sent to the fourth output port 12, from which it is sent to the second land station 32.

Figure 10:
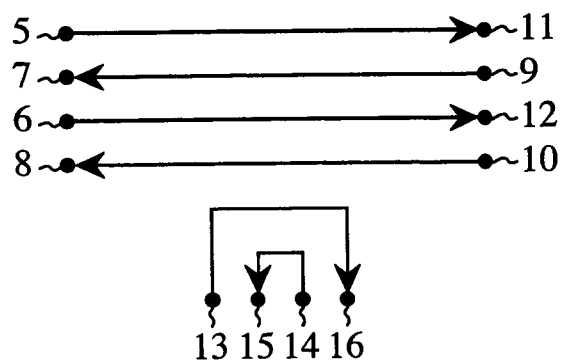
FIG. 10 is a conceptual diagram showing optical paths in the optical path switching circuit according to Embodiment 2 in the event of failure on the part of a third input/output port.

When a failure occurs on the part of the third input/output port 4 and the optical signal input from the third land station 33 to the fifth input port 13 cannot be normally sent to the first land station 31, the first land station 31 inputs to either one or both of the first and second input ports 5 and 6 optical signals containing optical switch control signals that turn ON the first and second optical switches 42 and 43. The first and second optical switches 42 and 43 are turned ON by drive signals from the optical switch control circuit 28 and the optical paths in the optical path switching circuit 1 become such as shown in FIG. 10.

That is, the optical path from the second input port 6 to the fifth output port 15 (i.e. the optical path from the first input/output port 2 to the third input/output port 4) changes to the optical path from the second input port 6 to the fourth output port 12 (i.e. the optical path from the first input/output port 2 to the second input/output port 3), and the optical path from the fourth input port 10 to the sixth output port 16 (i.e. the optical path from the second input/output port 3 to the third input/output port 4) changes to the optical path from the fourth input port 10 to the second output port 8 (i.e. the optical path from the second input/output port 3 to the first input/output port 2). Hence, it is possible to make full use of communications between the first and second land stations 31 and 32.

Further, the optical path from the sixth input port 14 to the fourth output port 12 (i.e. the optical path from the third input/output port 4 to the second input/output port 3) switches to the optical path from the sixth input 14 to the fifth output port 15 (i.e. the optical path from the third input/output port 4 to the third input/output port 4), and the optical path from the fifth input port 13 to the second output port 8 (i.e. the optical path from the third input/output port 4 to the first input/output port 2) switches to the optical path from the fifth input port 13 to the sixth output port 16 (i.e. the optical path from the third input/output port 4 to the third input/output port 4), thereby forming a loopback circuit. This enables the third land station 33 to check the failure-recovery status on the part of the third input/output port 4.

Thereafter, upon sending from the first land station 31 to either one or both of the first and second input ports 5 and 6 optical signals containing optical switch control signals for turning OFF the first and second optical switches 42 and 43, for example, when the failure on the part of the third input/output port 4 has been corrected, the first and second optical switches 42 and 43 turn OFF, allowing the optical path switching circuit 1 to reestablish the optical paths shown in FIG. 4.

When a failure occurs on the part of the third input/output port 4 and the optical signal input from the third land station 33 to the sixth input port 14 cannot be normally sent to the second land station 32, the second land station 32 inputs to either one or both of the third and fourth input ports 9 and 10 optical signals containing optical switch control signals that turn ON the first and second optical switches 42 and 43. The first and second optical switches 42 and 43 are turned ON by drive signals from the optical switch control circuit 28, and the optical paths in the optical path switching circuit 1 become such as shown in FIG. 10.

Figure 9:
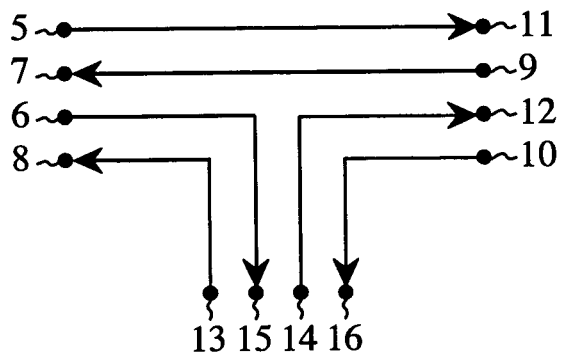
FIG. 9 is a conceptual diagram showing optical paths in the optical path switching circuit according to Embodiment 2 during normal operation.

Thereafter, upon sending from the second land station 32 to either one or both of the third and fourth input ports 9 and 10 optical signals containing optical switch control signals for turning OFF the first and second optical switches 42 and 43, for example, when the failure on the part of the third input/output port 4 has been corrected, the first and second optical switches 42 and 43 turn OFF, allowing the optical path switching circuit 1 to reestablish the optical paths shown in FIG. 9.

As described above, Embodiment 2 produces the same effects as are obtainable with Embodiment 1.

INDUSTRIAL APPLICABILITY

As described above, the optical path switching circuit according to the present invention is used in a submarine branching unit that forms an optical submarine cable system.

What is claimed is:

1. An optical path switching circuit comprising:
a first input/output port having first and second input ports and first and second output ports;
a second input/output port having third and fourth input ports and third and fourth output ports;
a third input/output port having fifth and sixth input ports and fifth and sixth output ports; and
a branching unit including,
a first optical switch that, during normal operation, forms an optical path from the second input port to the fifth output port and an optical path from the sixth input port to the fourth output port but, upon occurrence of an abnormal condition on the part of the third input/output port, forms an optical path from the second input port to the fourth output port and an optical path from the sixth input port to the fifth output port,
a second optical switch that, during normal operation, forms an optical path from the fourth input port to the sixth output port and an optical path from the fifth input port to the second output port but, upon occurrence of an abnormal condition on the part of the third input/output port, forms an optical path from the fourth input port to the second output port and an optical path from the fifth input port to the sixth output port,
a third optical switch that, during normal operation, forms an optical path from the first input port to the third output port and an optical path from the fourth input port to the sixth output port but, upon occurrence of an abnormal condition on the part of the second input/output port, forms an optical path from the first input port to the sixth output port and an optical path from the fourth input port to the third output port,
a fourth optical switch that, during normal operation, forms an optical path from the sixth input port to the fourth output port and an optical path from the third input port to the first output port but, upon occurrence of an abnormal condition on the part of the second input/output port, forms an optical path from the sixth input port to the first output port and an optical path from the third input port to the fourth output port,
a fifth optical switch that, during normal operation, forms an optical path from the fifth input port to the second output port and an optical path from the first input port to the third output port but, upon occurrence of an abnormal condition on the part of the first input/output port, forms an optical path from the fifth input port to the third output port and an optical path from the first input port to the second output port, and
a sixth optical switch that, during normal operation, forms an optical path from the third input port to the first output port and an optical path from the second input port to the fifth output port but, upon occurrence of an abnormal condition on the part of the first input/output port, forms an optical path from the third input port to the fifth output port and an optical path from the second input port to the first output port and
a circuit configured to receive optical switch control signals input via said first to fourth input ports and to control said first to sixth optical switches in response to the optical switch control signals.

2. An optical path switching circuit comprising:
a first input/output port having first and second input ports and first and second output ports;
a second input/output port having third and fourth input ports and third and fourth output ports;
a third input/output port having fifth and sixth input ports and fifth and sixth output ports; and
a branching unit including,
a first optical switch that, during normal operation, forms an optical path from the second input port to the fifth output port and an optical path from the sixth input port to the fourth output port but, upon occurrence of an abnormal condition on the part of the third input/output port, forms an optical path from the second input port to the fourth output port and an optical path from the sixth input port to the fifth output port,
a second optical switch that, during normal operation, forms an optical path from the fourth input port to the sixth output port and an optical path from the fifth input port to the second output port but, upon occurrence of an abnormal condition on the part of the third input/output port, forms an optical path from the fourth input port to the second output port and an optical path from the fifth input port to the sixth output port, and
a circuit configured to receive optical switch control signals input via said first to fourth input ports and to control said first and second optical switches in response to the optical switch control signals,
wherein there are always formed an optical path from the first input port to the third output port and an optical path from the third input port to the first output port.

* * * * *